United States Patent [19]

Nishikawa et al.

[11] Patent Number: 4,830,906
[45] Date of Patent: May 16, 1989

[54] MAGNETIC RECORDING MEDIUM

[75] Inventors: Yasuo Nishikawa; Masakazu Yoneyama, both of Kanagawa, Japan

[73] Assignee: Fuji Photo Film Co., Ltd., Kanagawa, Japan

[21] Appl. No.: 108,674

[22] Filed: Oct. 15, 1987

[30] Foreign Application Priority Data

Oct. 15, 1986 [JP] Japan .................................. 61-244990

[51] Int. Cl.$^4$ ................................................. G11B 5/71
[52] U.S. Cl. .................................. 428/335; 252/62.54; 427/128; 427/131; 428/336; 428/340; 428/341; 428/408; 428/694; 428/695; 428/900; 428/323; 428/328; 428/329
[58] Field of Search ............... 428/695, 694, 900, 704, 428/408, 329, 328, 323, 336, 219, 341, 340, 335; 252/62.54; 360/134–136

[56] References Cited

U.S. PATENT DOCUMENTS

| 4,253,886 | 3/1981 | Aonuma | 427/127 |
| 4,368,237 | 1/1983 | Yamada | 428/900 |
| 4,425,404 | 1/1984 | Suzuki | 428/341 |
| 4,514,451 | 4/1985 | Suzuki | 428/141 |
| 4,584,243 | 4/1986 | Kadokura | 428/900 |
| 4,590,127 | 5/1986 | Hashimoto | 428/900 |

Primary Examiner—Ellis P. Robinson
Attorney, Agent, or Firm—Sughrue, Mion, Zinn, Macpeak and Seas

[57] ABSTRACT

A magnetic recording medium comprising a non-magnetic support having provided thereon a magnetic layer containing ferromagnetic particles and a binder, wherein said magnetic layer contains at least one compound selected from the group consisting of an ammonium sulfate and an ammonium sulfonate.

14 Claims, No Drawings

MAGNETIC RECORDING MEDIUM

FIELD OF THE INVENTION

The present invention relates to a magnetic recording medium, and more particularly it relates to a magnetic recording medium having excellent running durability.

BACKGROUND OF THE INVENTION

A strong demand has arisen for a magnetic recording medium having a higher recording density. One approach to meet this demand is to make the surface of the magnetic layer smooth. However, when the surface of the magnetic layer is made smooth, the friction coefficient between the magnetic layer and the tape running system increases as the magnetic recording medium runs. This results in the magnetic layer being easily damaged or the magnetic layer being easily peeled off in a short period of its use.

In the case of a video tape, the magnetic layer is put under harsh conditions, such as during a still mode. Under such harsh conditions, ferromagnetic particles easily come off from the magnetic layer. This causes the magnetic head gap bridging (head clogging).

Conventionally, abrasive agents (hard particles) such as corundum, silicon carbide, chromium oxide, etc. are added to the magnetic layer to improve the running durability of the magnetic layer. In the case when abrasive agents are added to the magnetic layer to improve the running durability of the magnetic layer, a comparatively large amount thereof must be added to exhibit its abrasive effects However, the addition of such large amounts of the abrasive agents to the magnetic layer causes great wear on the magnetic head. Moreover, such is unfavorable for smoothing the surface of the magnetic layer so as to improve the electromagnetic properties.

It is also proposed that a fatty acid or an ester of a fatty acid and an aliphatic alcohol is added as a lubricating agent to the magnetic layer to reduce the friction coefficient.

With the recent increasing usage of portable video tape recorders and flexible disk drive apparatuses for personal computers, the magnetic recording medium is expected to be used under various conditions such as at a low temperature or at a high temperature and a high humidity. Accordingly, the running durability of the magnetic recording medium must be stable so as not to change under various conceivable conditions. The above-described conventional lubricating agents are not satisfactory for this purpose.

In video tapes and floppy disks, as the size of the magnetic recording medium is minimized by shortening the recording wavelength, as well as the track width, ferromagnetic alloy particles are more increasingly used than iron oxide type ferromagnetic particles as a material for the magnetic composition, and those having a smaller particles size are increasingly used. In this way, relatively excellent electromagnetic properties can be obtained by radically minimizing the size of the magnetic particles, but it is difficult to simultaneously achieve excellent running durability.

As a result of investigations as to lubricating agents to avoid the above-described disadvantages, it was found that stable running durability, which is stable even under harsh conditions such as at a high temperature and a high humidity or at a low temperature and a low humidity, can be obtained by incorporating an alkane sulfonate or an alkyl sulfate into a magnetic layer. (U.S. patent application Ser. No. 033,704 filed on Apr. 3, 1987). However, an alkane sulfonate or an alkyl sulfate generally have a low solubility in an organic solvent and therefore crystals are deposited on the magnetic layer. This causes video head gap bridging, particularly at a low humidity.

Examples of the magnetic recording medium containing an alkane sulfonate as a lubricating agent are described in Japanese Patent Publication No. 12949/72, but the characteristics thereof are not fully satisfactory.

SUMMARY OF THE INVENTION

An object of the present invention is, therefore, to provide a magnetic recording medium having excellent electromagnetic properties, running durability which is stable even under various conditions of temperatures and humidities, and having reduced occurrences of head gap bridging.

The above and other objects have been met by the present invention which relates to a magnetic recording medium comprising a non-magnetic support having provided thereon a magnetic layer containing ferromagnetic particles and a binder, wherein the magnetic layer contains at least one compound selected from the group consisting of an ammonium sulfate and an ammonium sulfonate.

DETAILED DESCRIPTION OF THE INVENTION

In the present invention, the ammonium sulfate and the ammonium sulfonate are preferably those compounds represented by formula (I).

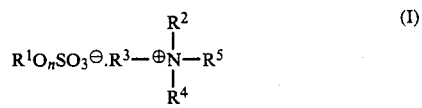

Wherein $R^1$ represents a saturated hydrocarbon group having from 10 to 24 carbon atoms, $R^2$ through $R^5$ each represents a hydrogen atom or a hydrocarbon group having from 1 to 22 carbon atoms, and n represents 0 or 1.

More preferably, the ammonium sulfate and the ammonium sulfonate are those represented by formula (I) wherein $R^1$ represents a saturated hydrocarbon group having from 16 to 24 carbon atoms, $R^2$ through $R^5$ each represents a hydrocarbon group having from 1 to 22 carbon atoms provided that at least one of $R^2$ through $R^5$ represents a saturated hydrocarbon group having from 16 to 22 carbon atoms, and n represents 0 or 1.

The non-magnetic supports used in the present invention may be those commonly used.

Examples of the non-magnetic supports include various synthetic resin films such as polyethylene terephthalate, polypropylene, polycarbonate, polyethylene naphthalate, polyamide, polyamide imide, or polyimide, and metal foils such as aluminum foil or stainless steel foil. The thickness of the support is generally from 3 to 50 μm, and preferably from 5 to 30 μm.

A backing layer may be provided on the surface of the support opposite to the surface provided with the magnetic layer.

Examples of the backing layer include those described in U.S. Pat. Nos. 4,474,843, 4,273,797, 4,419,406, 4,135,031, 4,544,601, and 4,567,083.

It is necessary that the ammonium sulfate or an ammonium sulfonate be incorporated in the magnetic layer of the magnetic recording medium of the present invention. The ammonium sulfate or ammonium sulfonate may be contained uniformly inside of the magnetic layer and preferably is contained locally on the surface of the magnetic layer. Non-limiting examples of the ammonium sulfate or ammonium sulfonate are illustrated as follows.

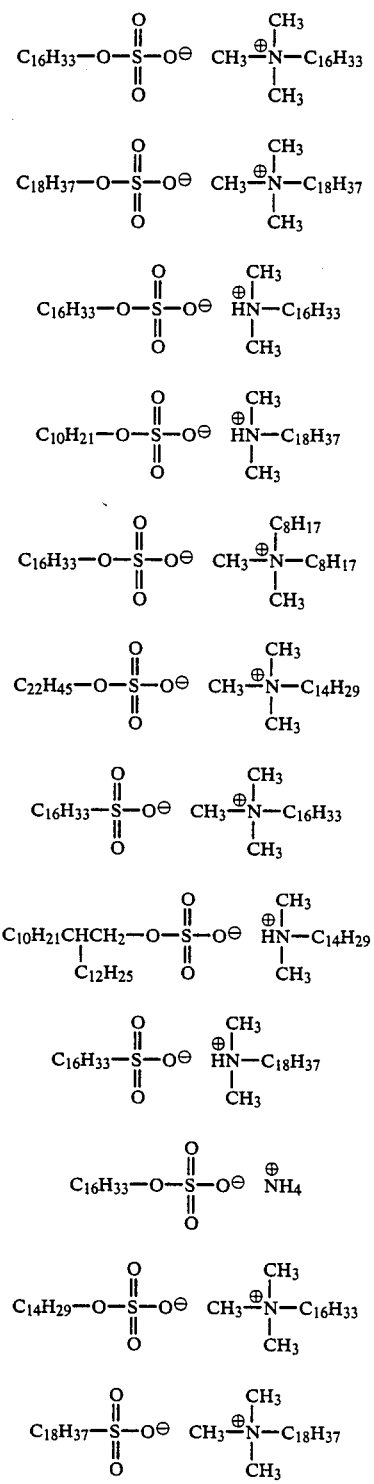

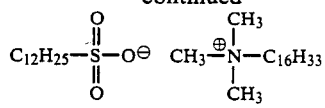

It is preferred that the solution of ammonium sulfonate or ammonium sulfate is top-coated on the magnetic layer in view of reducing the friction coefficient. The ammonium sulfonate or ammonium sulfate is dissolved in a solvent such as water, methanol, acetone, a mixed solvent of water and methanol, a mixed solvent of water and acetone, etc., and then top-coated on the magnetic layer by an air doctor coating method, a blade coating method, a rod coating method, an extruding coating method, an air knife coating method, a squeeze roll coating method, a transfer roll coating method, a gravure coating method, a kiss coating method, a cast coating method, a spray coating method, a spin coating method or a bar coating method. The coated amount of the top-coated layer is preferably from 10 to 500 mg/m², more preferably from 20 to 200 mg/m². When the ammonium sulfonate or ammonium sulfate is incorporated in the magnetic coating composition, the additive amount thereof is preferably from 0.01 wt % to 10.0 wt %, more preferably from 0.05 wt % to 6 wt %, based on the amount of the ferromagnetic particles.

The ferromagnetic particles used in the present invention are not limited. Examples thereof include ferromagnetic alloy particles, $\gamma$-$Fe_2O_3$, $Fe_3O_4$, Co-modified iron oxide, $CrO_2$, modified barium ferrite, and modified strontium ferrite.

The shape of the ferromagnetic particles is not particularly limited, and an acicular shape, a granular shape, a cubic shape, a rice grain shape, a tabular shape, etc. are used. The specific surface area of the ferromagnetic particles is preferably 30 m²/g or more, and more preferably 45 m²/g or more in view of the electromagnetic properties.

Examples of the binders used for forming the magnetic layer include those conventionally used, such as a copolymer of vinyl chloride and vinyl acetate, a copolymer of vinyl chloride and vinyl acetate with vinyl alcohol, maleic acid and/or acrylic acid, a copolymer of vinyl chloride and vinylidene chloride, a copolymer of vinyl chloride and acrylonitrile, a copolymer of ethylene and vinyl acetate, cellulose derivatives (e.g., a nitrocellulose resin), an acrylic resin, a polyvinyl acetal resin, a polyvinyl butyral resin, an epoxy resin, a phenoxy resin, a polyurethane resin, and a polycarbonate polyurethane resin.

The total amount of the binders included in the magnetic layer of the magnetic recording medium of the present invention is generally from 10 to 100 parts by weight, and preferably from 20 to 40 parts by weight per 100 parts by weight of the ferromagnetic particles.

It is preferred that inorganic particles having a Mohs' hardness of 5 or more are included in the magnetic layer of the magnetic recording medium of the present invention.

The inorganic particles used in the present invention are not particularly limited so long as the inorganic particles have a Mohs' hardness of 5 or more. Examples of the inorganic particles having a Mohs' hardness of 5 or more include $Al_2O_3$ (Mohs' hardness of 9), TiO (Mohs' hardness of 6), $TiO_2$ (Mohs' hardness of 6.5), $Cr_2O_3$ (Mohs' hardness of 9) and $\alpha\text{-}Fe_2O_3$ (Mohs' hardness of 5.5). They may be used alone or in combination.

Inorganic particles having a Mohs' hardness of 8 or more are particular preferred. When relatively soft inorganic particles having a Mohs' hardness of 5 or less are used, the inorganic particles readily come off from the magnetic layer and do not function well as an abrasive agent, thereby causing head gap bridging and poor running durability.

The content of inorganic particles is generally from 0.1 to 20 parts by weight, and preferably from 1 to 10 parts by weight per 100 parts by weight of ferromagnetic particles.

It is also preferred that carbon black having an average particles size of from 10 to 300 nm is included in the magnetic layer in addition to the above-described inorganic particles. The preferred amount of the carbon black is from 1 to 50 wt % based on the amount of the ferromagnetic particles. The most preferred amount of the carbon black varies depending on the purpose of the recording medium, and tends to decrease with the increase of the recording density.

A method for preparing the magnetic recording medium of the present invention is illustrated hereinafter, referring to the case when an ammonium sulfonate or ammonium sulfate is included in the magnetic coating solution.

First of all, ferromagnetic particles, binders, the above-described ammonium sulfonate or ammonium sulfate and, if necessary, fillers and additives are mixed and kneaded with a solvent to prepare a magnetic coating solution. The solvents generally used for preparing the magnetic coating solution are used upon mixing and kneading.

The methods for mixing and kneading are not limited, and the order of adding each component can be optionally selected.

The mixing and kneading devices are those generally used, such as a two-roll mill, a three-roll mill, a ball mill, a pebble mill, a high speed impellor dispersing device, a high speed stone mill, a high speed impact mill, a disper, a kneader, a high speed mixer, a homogenizer, an ultrasonic dispersing device or the like.

The conventionally known additives such as a dispersing agent, an antistatic agent, a lubricating agent, etc. can be used in combination upon preparing the magnetic coating solution.

Examples of the dispersing agents include a fatty acid having from 12 to 22 carbon atoms such as caprylic acid, capric acid, lauric acid, myristic acid, palmitic acid, stearic acid, beheic acid, oleic acid, elaidic acid, linolic acid, linolenic acid or stearol acid; a metal soap composed of the above fatty acid and an alkali metal (e.g. Li Na, K, and Ba); an ester of the above fatty acid, an ester of the above fatty acid wherein a part of or all of the hydrogens are substituted with fluorine atoms, an amide of the above fatty acid, an aliphatic amine, a higher alcohol, a polyalkylene oxide alkylphosphate, an alkylphosphate, an akkylborate, a sarcosinate, an alkyl ether ester, a trialkylpolyolefin, an oxyquaternary ammonium salt, and a lecithin.

The preferred amount of dispersing agents added is from 0.1 to 10 parts by weight per 100 parts by weight of the ferromagnetic particles.

Examples of the antistatic agents used in the present invention include electroconductive fine particles such as carbon black and carbon black graft polymer; natural surface active agents such as saponin; nonionic surface active agents such as an alkylene oxide type surface active agent, a glycerine type surface active agent, and a glycidol type surface active agent; cationic surface active agents such as a higher alkyl amine, a quarternary ammonium salt, pyridine and other heterocyclic compounds (e.g., pyridine), a phosphonium, and a sulfonium; anionic surface active agents such as a compound having an acidic group, e.g., a carboxyl group, a phosphoril group, and a phosphate group; and amphoteric surface active agents such as an amino acid, an amino sulphonic acids, and a sulfate or a phosphate of an aminoalcohol.

When the above electroconductive particles are used as the antistatic agent, they are preferably used in an amount of from 0.1 to 10 parts by weight per 100 parts by weight of the ferromagnetic particles. When the above surface active agents are used as the antistatic agent, they are preferably used in an amount of from 0.12 to 10 parts by weight per 100 parts by weight of the ferromagnetic particles.

Examples of lubricating agents other than those according to the present invention include esters composed of a monobasic fatty acid having from 12 to 20 carbon atoms and an alcohol having from 3 to 20 carbon atoms such as butyl stearate and sorbitanoleate, a mineral oil, an animal and vegetable oil, an olefin oligomer, a fatty acid amide, a silicone oil, a modified silicone oil, an alkyleneoxide adduct product of fatty acid, graphite particles, molybdenum disulfide, tetrafluoroethylene polymer particles, and lubricating agents for plastics known in the art. The amount thereof is preferably from 0.2 to 2.0 wt % based on the amount of the ferromagnetic particles. More preferably, the amount thereof is from 0.2 to 1.0 wt % based on the amount of the ferromagnetic particles for the silicone oils, and from 0.5 to 1.5 wt % based on the amount of the ferromagnetic particles for those other than silicone oils.

The above-described functions and effects of the above additives, such as dispersing agents, antistatic agents, and lubricating agents, are not decisive, and it may be that, for example, a dispersing agent also functions as a lubricating agent or as an antistatic agent. Accordingly, it is understood that the above classifications of the additives due to their functions are not decisive. If additives having multifunctions are used, the added amounts thereof is preferably determined in light of the multiple effects.

The thus prepared magnetic coating solution is coated on the above described non-magnetic support. The magnetic layer can be provided directly on the non-magnetic support or can be provided through an adhesive layer, etc. on the non-magnetic layer.

The methods for coating the magnetic layer on the non-magnetic support include an air doctor coating method, a blade coating method, a rod coating method, an extruding coating method, an air knife coating method, a squeeze coating method, an impregnating coating method, a reverse roll coating method, a transfer roll coating method, a gravure coating method, a kiss coating method, a cast coating method, a spray coating method, and a spin coating method, as well as any other method generally used in th art.

The method for dispersing the above ferromagnetic particles and the binder, and the method for coating the magnetic layer on the support are disclosed in detail in Japanese Patent Application (OPI) Nos. 46011/79 and 21805/79 (the term "OPI" as used herein means an "unexamined published application".)

The dry thickness of the magnetic layer is generally from about 0.5 to 10 μm, and preferably from 1.5 to 7.0 μm.

In the case when the magnetic recording medium of the present invention is used in the shape of a tape, the magnetic layer thus coated on the support may be subjected to magnetic orientation to have the ferromagnetic particles orientated and then dried. If necessary, the magnetic layer is subjected to surface smoothening treatment followed by cutting into a desired shape.

The present invention will be illustrated in more detail by the following Examples and Comparative Examples which do not limit the present invention. In the following Examples and Comparative Examples, all parts and percents are by weight unless otherwise indicated.

EXAMPLES 1 TO 7 AND COMPARATIVE EXAMPLES 1 TO 5

The following composition was mixed, kneaded and dispersed for 48 hours using a ball mill, 5 parts of poly isocyanate were added thereto, and mixed, kneaded and dispersed for another 1 hour. The dispersed solution was filtrated using a filter having an average pore diameter of 1 μm to prepare a magnetic coating solution. The resulting magnetic coating solution below was coated using a reverse roll on a polyethylene terephthalate support having a 10 μm thickness so that the dry thickness of the magnetic layer was 4.0 μm.

Composition of the magnetic coating solution

| | |
|---|---|
| Ferromagnetic alloy particles (composed of Fe 94%, Zn 4% and Ni 2%; Coercive force 1,500 Oe; specific surface area 54 mg/m$^2$) | 100 parts |
| Copolymer of vinyl chloride, vinyl acetate and maleic anhydride (400X110A, manufactured by Nippon Zeon Co., Ltd., Degree of polymerization 400) | 12 parts |
| Abrasive agent (α-alumina, average particle diameter 3 μm) | 5 parts |
| Additive | (Shown in Table 1) |
| Stearic acid | 1 part |
| Carbon black (average particle diameter 40 nm) | 2 parts |
| Methyl ethyl ketone | 300 parts |

The non-magnetic support thus coated with the magnetic coating solution was subjected to magnetic orientation using magnets of 3,000 gauss while the magnetic coating solution was undried, then dried and was subjected to a super calendering treatment followed by being slit to a width of 8 mm to prepare a 8 mm video tape.

EXAMPLES 8 TO 12 AND COMPARATIVE EXAMPLES 6 TO 12

The following composition was mixed, kneaded and dispersed for 48 hours using a ball mill, 5 parts of poly isocyanate were added thereto, and mixed, kneaded and dispersed for another 1 hour. The dispersion was filtrated using a filter having an average pore diameter of 1 μm to prepare a magnetic coating solution. The resulting magnetic coating solution was coated using a reverse roll on a polyethylene terephthalate support having 10 μm thickness so that the dry thickness of the magnetic layer was 4.0 μm.

Composition of the magnetic coating solution:

| | |
|---|---|
| Ferromagnetic alloy particles (composed of Fe: 94%, Zn: 4%, and Ni: 2%; Coercive force 1,500: Oe; Specific surface area: 54 mg/m$^2$) | 100 parts |
| Copolymer of vinyl chloride, vinyl acetate and maleic anhydride (400X110A, manufactured by Nippon Zeon Co., Ltd., Degree of polymerization: 400) | 12 parts |
| Abrasive agent (α-alumina, average particle diameter: 3 μm) | 5 parts |
| Stearic acid | 1 part |
| Carbon black (average particle diameter: 40 nm) | 2 parts |
| Methyl ethyl ketone | 300 parts |

The non-magnetic support thus coated with the magnetic coating solution was subjected to magnetic orientation using magnets of 3,000 gauss while the magnetic coating solution was undried, dried and was subjected to a super calendering treatment, and thereafter topcoated with a solution of the compound as shown in Table 2 using a bar coater followed by being slit to a 8 mm width to prepare a 8 mm video tape.

Signals of 7 MHz were recorded on the thus obtained tapes and reproduced using a VTR ("JUJIX-8", manufactured by Fuji Photo Film Co., Ltd.). The reproduction output signals were measured and were shown in terms of relative values when the reproduced output signal of a standard tape (Comparative Example 1) was assumed to be 0 dB.

The thus obtained video tapes were contacted with a stainless steel pole (winding angle: 180°) at a 50 g tension (T$_1$) and the condition, tension (T$_2$), necessary to make the video tape run at a speed of 3.3 cm/s was measured. The friction coefficient μ of the video tape was calculated by the following equation based on the measured values, (shown in Tables 1 and 2).

$$\mu = 1/\pi \cdot \ln(T_2/T_1)$$

The above test of the friction coefficient was carried out under two conditions, that is, Condition (a) at 20° C. and 70% RH and Condition (b) at 40° C. and 80% RH.

Recording and reproducing were carried out using the above described VTR at 20° C. and at 10% RH, and the number of occurrences of head gap bridging was measured during reproducing for 30 minutes.

The results are shown in Tables 1 and 2.

TABLE 1

| Sample | Additive | Additive amounts (parts) | Reproduction output (dB) | Friction coefficient (μ) condition (a) | Friction coefficient (μ) condition (b) | Head clogging (number of occurrences/30 min.) |
|---|---|---|---|---|---|---|
| Example 1 | (A) | 2 | +1 | 0.20 | 0.20 | 0 |
| Example 2 | (B) | 2 | +1 | 0.18 | 0.20 | 0 |
| Example 3 | (C) | 2 | +1 | 0.20 | 0.25 | 0 |
| Example 4 | (D) | 2 | +1 | 0.22 | 0.26 | 0 |
| Example 5 | (E) | 2 | +1 | 0.22 | 0.27 | 0 |
| Example 6 | (F) | 2 | +1 | 0.19 | 0.21 | 0 |

TABLE 1-continued

| Sample | Additive | Additive amounts (parts) | Reproduction output (dB) | Friction coefficient ($\mu$) condition (a) | Friction coefficient ($\mu$) condition (b) | Head clogging (number of occurrences/30 min.) |
|---|---|---|---|---|---|---|
| Example 7 | (G) | 2 | +1 | 0.20 | 0.23 | 0 |
| Comparative Example 1 | (H) | 2 | +1 | 0.24 | 0.26 | 10–20 |
| Comparative Example 2 | Oleic acid | 2 | +1 | 0.26 | 0.37 | 0 |
| Comparative Example 3 | 2-ethylhexyl myristate | 2 | 0 | 0.26 | 0.35 | 0 |
| Comparative Example 4 | Stearic acid | 2 | +0.5 | 0.25 | 0.35 | 5–10 |
| Comparative Example 5 | None | — | 0 | 0.27 | 0.39 | 5–10 |

TABLE 2

| Sample | Compounds to be top-coated | Solvent | Coating (amount) | Reproduction output (dB) | Friction coefficient ($\mu$) condition (a) | Friction coefficient ($\mu$) condition (b) | Head clogging (number of occurrences/30 min.) |
|---|---|---|---|---|---|---|---|
| Example 8 | (A) | methanol | 25 | +1 | 0.16 | 0.19 | 0 |
| Example 9 | (B) | methanol | 25 | +1 | 0.15 | 0.16 | 0 |
| Example 10 | (C) | methanol | 25 | +1 | 0.18 | 0.22 | 0 |
| Example 11 | (D) | methanol | 25 | +1 | 0.19 | 0.21 | 0 |
| Example 12 | (E) | methanol | 25 | +1 | 0.20 | 0.22 | 0 |
| Comparative Example 6 | (H) | methanol | 25 | +1 | 0.22 | 0.27 | 5–10 |
| Comparative Example 7 | Oleic acid | acetone | 25 | +1 | 0.30 | 0.31 | 0 |
| Comparative Example 8 | 2-ethylhexyl myristate | acetone | 25 | 0 | 0.35 | 0.35 | 0 |
| Comparative Example 9 | Stearic acid | acetone | 25 | 0 | 0.28 | 0.31 | 5–10 |
| Comparative Example 10 | None | — | — | 0 | 0.35 | 0.37 | 5–10 |
| Comparative Example 11 | None (Only solvent was coated.) | methanol | — | 0 | 0.35 | 0.37 | 5–10 |
| Comparative Example 12 | None (Only solvent was coated.) | Acetone | — | 0 | 0.35 | 0.37 | 5–10 |

Compounds (A) to (H) added or coated are shown below.

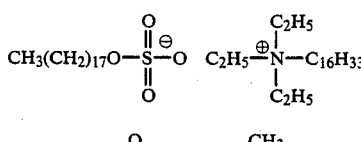
(A)

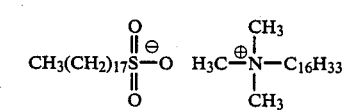
(B)

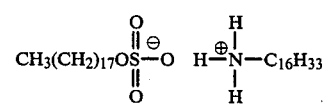
(C)

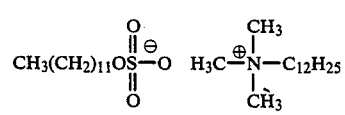
(D)

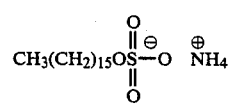
(E)

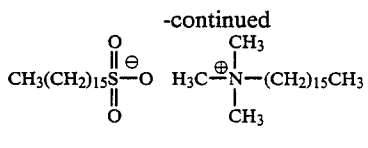
(F)

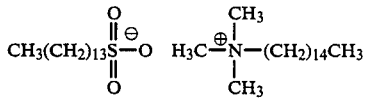
(G)

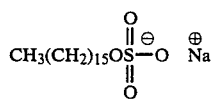
(H)

It is clear from the results of Tables 1 and 2 that Examples 1 through 12 using the ammonium sulfonate or ammonium sulfate according to the present invention exhibit high outputs, low friction coefficient under both Conditions (a) and (b), and reduced head gap bridging at a low humidity.

On the other hand, in the case when the compounds of the present invention were not used, or only a fatty acid or an ester were used, the reproduced outputs were low and particularly there is a serious problem that the friction coefficient under a high temperature and a high humidity (Condition (b)) was high.

Further in case when a sulfate or a sulfonate other than those according to the present invention were used, an excellent friction coefficient was obtained, but there was a problem as to head gap bridging under the harsh condition of a low humidity.

As stated in the foregoing, the magnetic recording medium of the present invention not only exhibits a high output but also has excellent still life as well as running durability, and further exhibits a low friction coefficient under a wide range of conditions of temperatures and humidities and improved head gap bridging at a low humidity.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a nonmagnetic support having provided thereon a magnetic layer containing ferromagnetic particles and a binder, wherein said magnetic layer has at least one compound selected from the group consisting of an ammonium sulfate and an ammonium sulfonate incorporated in the magnetic layer or top-coated on the surface of the magnetic layer, wherein said ammonium sulfate and said ammonium sulfonate are represented by formula (I)

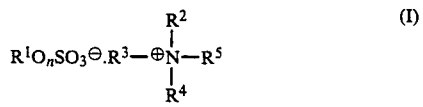

wherein $R^1$ represents saturated hydrocarbon group having from 10 to 24 carbon atoms; $R^2$ through $R^5$ each represents a hydrocarbon group having from 1 to 22 carbon atoms or a hydrogen atom, wherein at least one of $R^2$ through $R^5$ is a hydrocarbon group having from 8 to 22 carbon atoms; and n represents 0 to 1.

2. A magnetic recording medium as claimed in claim 1, additionally comprising carbon black having an average particle size of from 10 to 30 μm.

3. A magnetic recording medium as claimed in claim 1, wherein $R^1$ represents saturated hydrocarbon group having from 16 to 24 carbon atoms; $R^2$ through $R^5$ each represents a hydrocarbon group having from 1 to 22 carbon atoms provided that at least one of $R^2$ through $R^5$ represents a saturated hydrocarbon group having from 16 to 22 carbon atoms; and n represents 0 or 1.

4. A magnetic recording medium as claimed in claim 1, wherein said ammonium sulfate and said ammonium sulfonate is top-coated on the surface of said magnetic layer.

5. A magnetic recording medium as claimed in claim 4, wherein said ammonium sulfate and said ammonium sulfonate is top-coated on said magnetic layer in an amount of from 10 to 500 mg/m².

6. A magnetic recording medium as claimed in claim 5, wherein said ammonium sulfate and said ammonium sulfonate is top coated on said magnetic layer in an amount of from 20 to 200 mg/m².

7. A magnetic recording medium as claimed in claim 1, wherein said magnetic layer further contains inorganic particles having a Mohs' hardness of 5 or more.

8. A magnetic recording medium as claimed in claim 7, wherein said magnetic layer further contains inorganic particles having a Mohs' hardness of 8 or more.

9. A magnetic recording medium as claimed in claim 1, wherein said ammonium sulfate and said ammonium sulfonate are incorporated in a magnetic coating composition in an amount of from 0.01 to 10.0 wt % based on the weight of said ferromagnetic particles.

10. A magnetic recording medium as claimed in claim 9, wherein said ammonium sulfate and said ammonium sulfonate are incorporated in a magnetic coating composition in an amount of from 0.05 to 6.0 wt % based on the weight of said ferromagnetic particles.

11. A magnetic recording medium as claimed in claim 7, wherein said inorganic particles are employed in an amount of from 0.1 to 20 parts by weight per 100 parts by weight of said ferromagnetic particles.

12. A magnetic recording medium as claimed in claim 11, wherein said inorganic particles are employed in an amount of from 0.1 to 10 parts by weight per 100 parts by weight of said ferromagnetic particles.

13. A magnetic recording medium as claimed in claim 1, wherein the thickness of said magnetic layer is from 0.5 to 10 μm.

14. A magnetic recording medium as claimed in claim 13, wherein the thickness of said magnetic layer is from 1.5 to 7.0 μm.

* * * * *